(12) United States Patent
Liu et al.

(10) Patent No.: US 10,104,560 B2
(45) Date of Patent: Oct. 16, 2018

(54) TESTING MACHINE AND SYSTEM FOR MOBILE PHONE

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Yu-Ching Liu, New Taipei (TW); Wei-Da Yang, New Taipei (TW); Po-Lin Su, New Taipei (TW); Jie-Peng Kang, Shenzhen (CN); Xue-Rui Deng, Shenzhen (CN); Liu-Ming Zhang, Shenzhen (CN); Rui Li, Shenzhen (CN); Su-Min Li, Shenzhen (CN); Yong-Qiang Han, Shenzhen (CN); Guang-Xing Wang, Shenzhen (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 274 days.

(21) Appl. No.: 15/071,411

(22) Filed: Mar. 16, 2016

(65) Prior Publication Data
US 2017/0156073 A1    Jun. 1, 2017

(30) Foreign Application Priority Data
Nov. 30, 2015  (CN) .......................... 2015 1 0859090

(51) Int. Cl.
*H04W 24/06*  (2009.01)
*G06F 3/0354*  (2013.01)
(Continued)

(52) U.S. Cl.
CPC ............ *H04W 24/06* (2013.01); *G03B 43/00* (2013.01); *G06F 3/03545* (2013.01);
(Continued)

(58) Field of Classification Search
CPC ............... G06F 3/03545; G06F 3/0416; G06F 11/2221; G06F 3/04842; G06F 3/0482;
(Continued)

(56) References Cited

U.S. PATENT DOCUMENTS 8,111,073 B2 *  2/2012  Lin ........................ H04M 1/24
                                                  324/555
8,774,793 B2 *  7/2014  Fishel .................... H01Q 1/241
                                                  455/115.1
(Continued)

*Primary Examiner* — Nikolay Yushin
(74) *Attorney, Agent, or Firm* — ScienBiziP, P.C.

(57) ABSTRACT

A machine for testing the parts and functions of a mobile phone includes a supporting mechanism, a platform, a receiving portion, and a detecting mechanism. The supporting mechanism is mounted in a box. The platform is slidably mounted on the supporting mechanism. The receiving portion is used to receive the mobile phone. The receiving portion is rotatably mounted on the platform. Devices within the machine are operated to test the mobile phone. A mobile phone testing system used in the testing machine is also described.

14 Claims, 18 Drawing Sheets

(51) Int. Cl.
*G06F 3/041* (2006.01)
*H04M 1/725* (2006.01)
*H04N 5/225* (2006.01)
*H04W 4/02* (2018.01)
*G03B 43/00* (2006.01)
*H04N 17/00* (2006.01)
*G06F 11/22* (2006.01)

(52) U.S. Cl.
CPC ........ *G06F 3/0416* (2013.01); *G06F 11/2221* (2013.01); *H04M 1/72583* (2013.01); *H04N 5/2257* (2013.01); *H04N 17/002* (2013.01); *H04W 4/026* (2013.01)

(58) Field of Classification Search
CPC ............... G06F 3/04847; G03B 43/00; H04M 1/72583; H04M 1/72519; H04M 1/0202; H04N 5/2257; H04N 17/002; H04W 4/026; H04W 24/06; H04W 4/027
See application file for complete search history.

(56) References Cited

U.S. PATENT DOCUMENTS

| | | | |
|---|---|---|---|
| 9,283,672 B1* | 3/2016 | Matthews | G01M 99/008 |
| 9,635,153 B2* | 4/2017 | Haapea | H04M 1/24 |
| 2009/0045819 A1* | 2/2009 | Lin | H04M 1/24 |
| | | | 324/555 |
| 2009/0312009 A1* | 12/2009 | Fishel | H01Q 1/241 |
| | | | 455/425 |
| 2014/0312187 A1* | 10/2014 | Haapea | H04M 1/24 |
| | | | 248/176.1 |

* cited by examiner

TESTING MACHINE AND SYSTEM FOR MOBILE PHONE

CROSS-REFERENCE TO RELATED APPLICATIONS

This application claims priority to Chinese Patent Application No. 201510859090.4 filed on Nov. 30, 2015, the contents of which are incorporated by reference herein.

FIELD

The subject matter herein generally relates to test equipment for mobile phones.

BACKGROUND

A mobile phone needs to be tested after manufacture. The mobile phone usually includes a plurality of components and each component and function needs to be tested.

BRIEF DESCRIPTION OF THE DRAWINGS

Implementations of the present technology will now be described, by way of example only, with reference to the attached figures.

DETAILED DESCRIPTION

Figure 1:
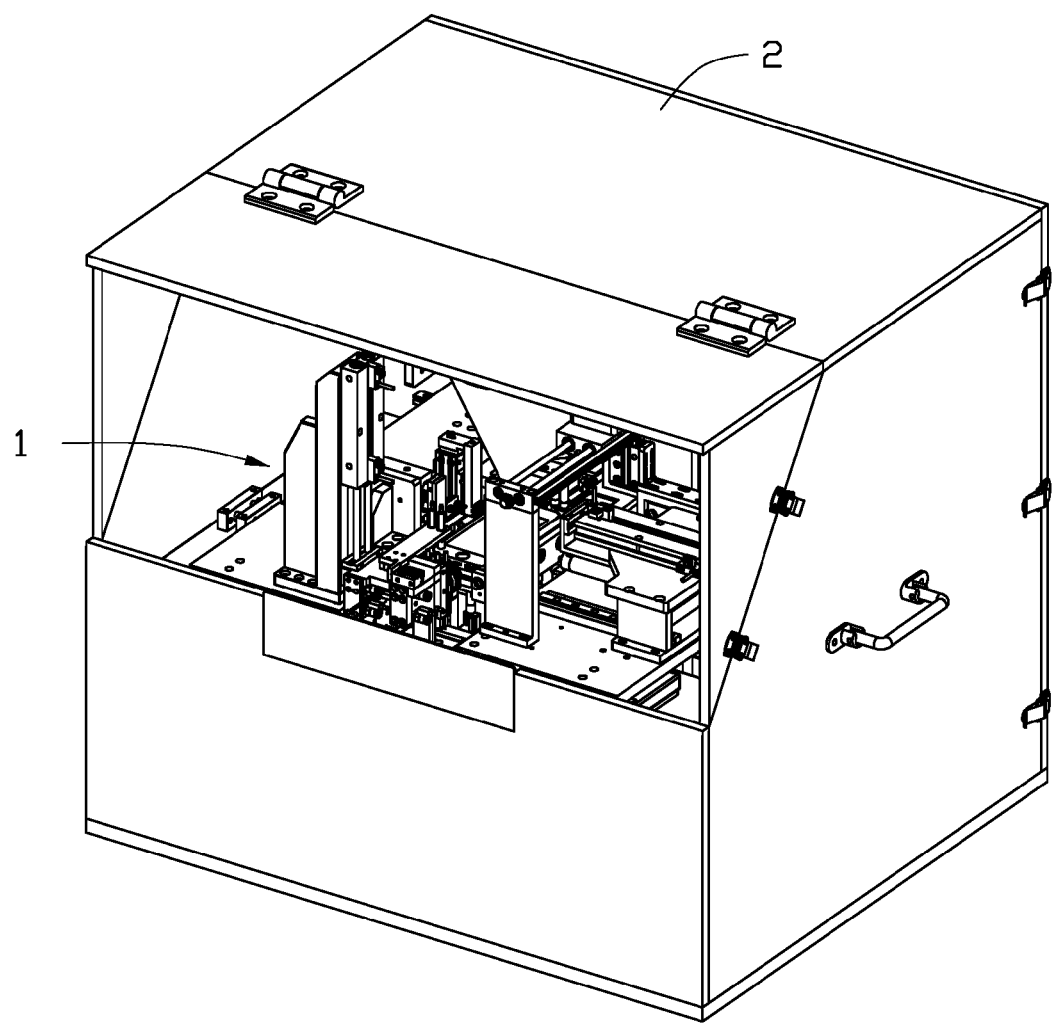
FIG. 1 is an isometric view of a testing machine for a mobile phone, the testing machine being mounted in a box.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a testing machine for a mobile phone. The testing machine includes a supporting mechanism, a platform, a receiving portion, and a detecting mechanism. The supporting mechanism is mounted in a box. The platform is slidably mounted on the supporting mechanism. The receiving portion receives the mobile phone. The receiving portion is rotatably mounted on the platform. The detecting mechanism tests the mobile phone and its parts and functions. A mobile phone testing system can be used in the testing machine.

Figure 2:
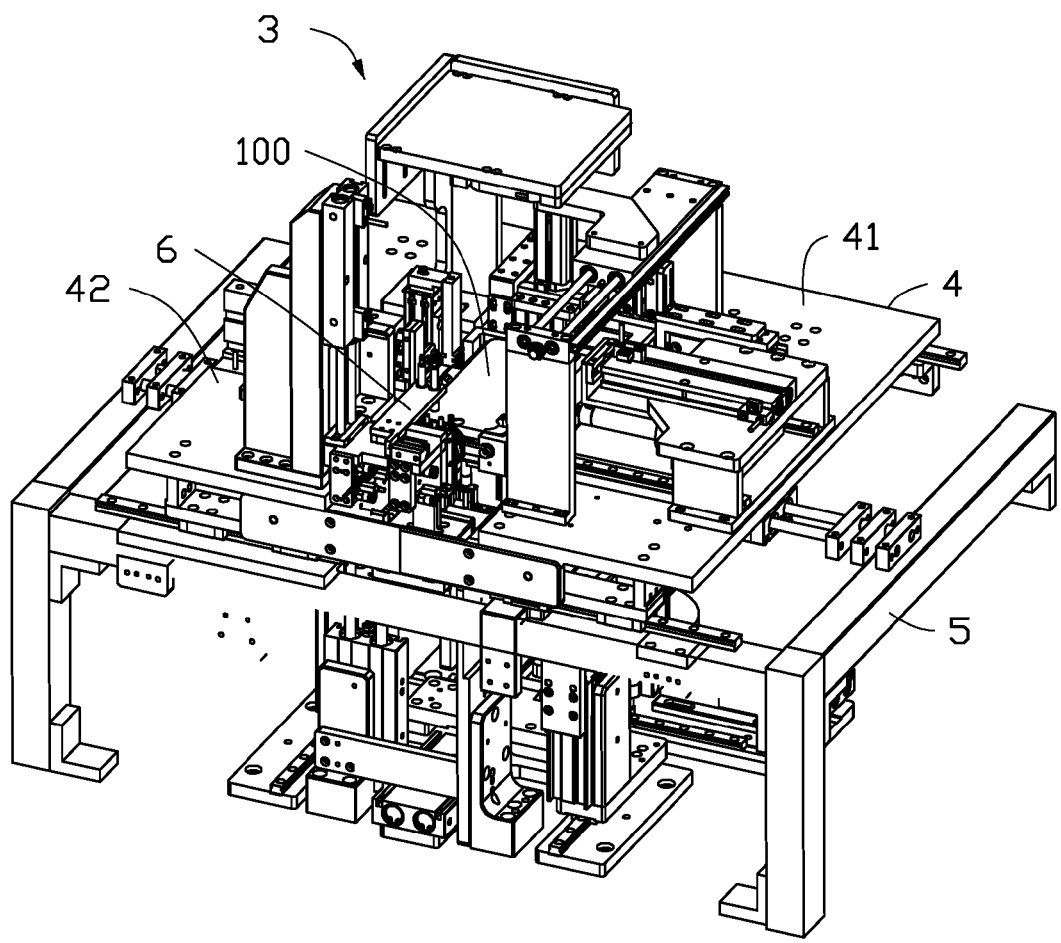
FIG. 2 is an isometric view of the testing machine of FIG. 1.

FIGS. 1-2 illustrate one embodiment of a testing machine 1 for a mobile phone 100. The testing machine 1 is mounted in a box 2. The testing machine 1 includes a detecting mechanism 3, a platform 4, a supporting mechanism 5, and a receiving portion 6. The supporting mechanism 5 is mounted in the box 2. The platform 4 is slidably mounted on the supporting mechanism 5. The receiving portion 6 is rotatably mounted on the platform 4 and is used to receive the mobile phone 100.

Figure 3:
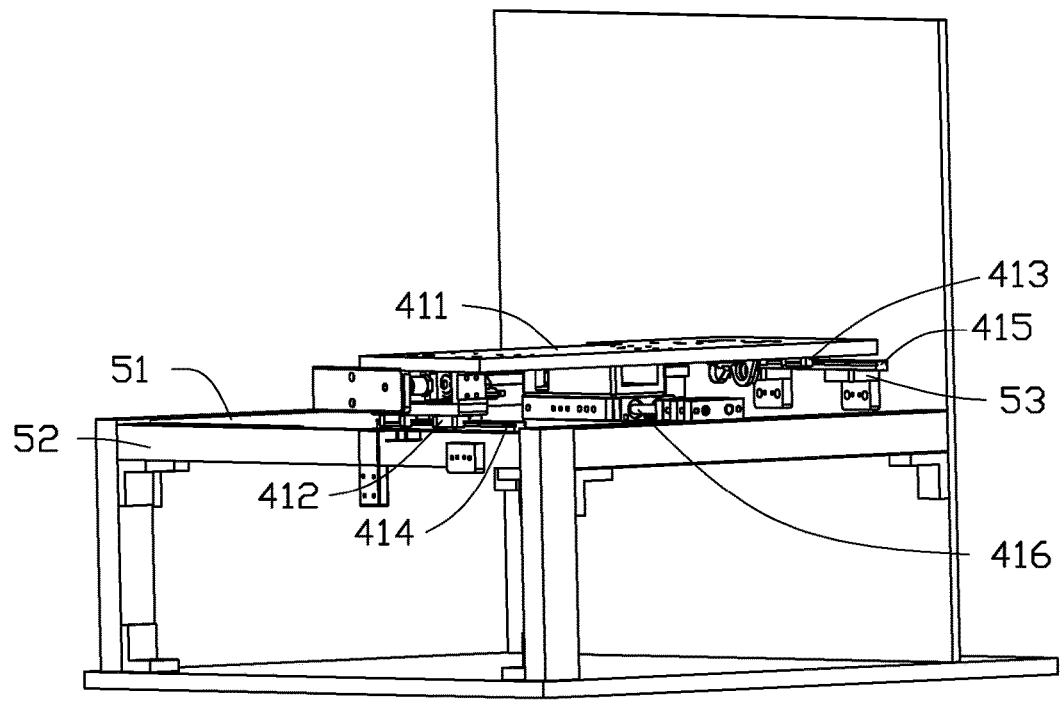
FIG. 3 is an isometric view of a supporting mechanism of the testing machine of FIG. 1, viewed from a different point as compared to FIG. 2.

FIG. 3 illustrates one embodiment of the supporting mechanism 5. The supporting mechanism 5 includes two first brackets 51, a second bracket 52 connected to the two first brackets 51, and a supporting member 53.

The platform 4 includes a first sliding platform 41 and a second sliding platform 42. The first sliding platform 41 is the same as the second sliding platform 42. The first sliding platform 41 and the second sliding platform 42 are symmetry aligned on the supporting mechanism 5.

The first sliding platform 41 includes a panel 411, a first sliding block 412, a second sliding block 413, a first sliding rail 414, a second sliding rail 415, and a first cylinder 416. The first sliding rail 414 is fastened on the second bracket 52. The second sliding rail 415 is fastened on the supporting member 53. The first sliding block 412 is slidably mounted on the first sliding rail 414. The second sliding block 413 is slidably mounted on the second sliding rail 415. The panel 411 is mounted on the first sliding block 412 and the second sliding block 413. The panel 411 can be slid along the first sliding rail 414 and the second sliding rail 415 by the first cylinder 416.

Figure 4:
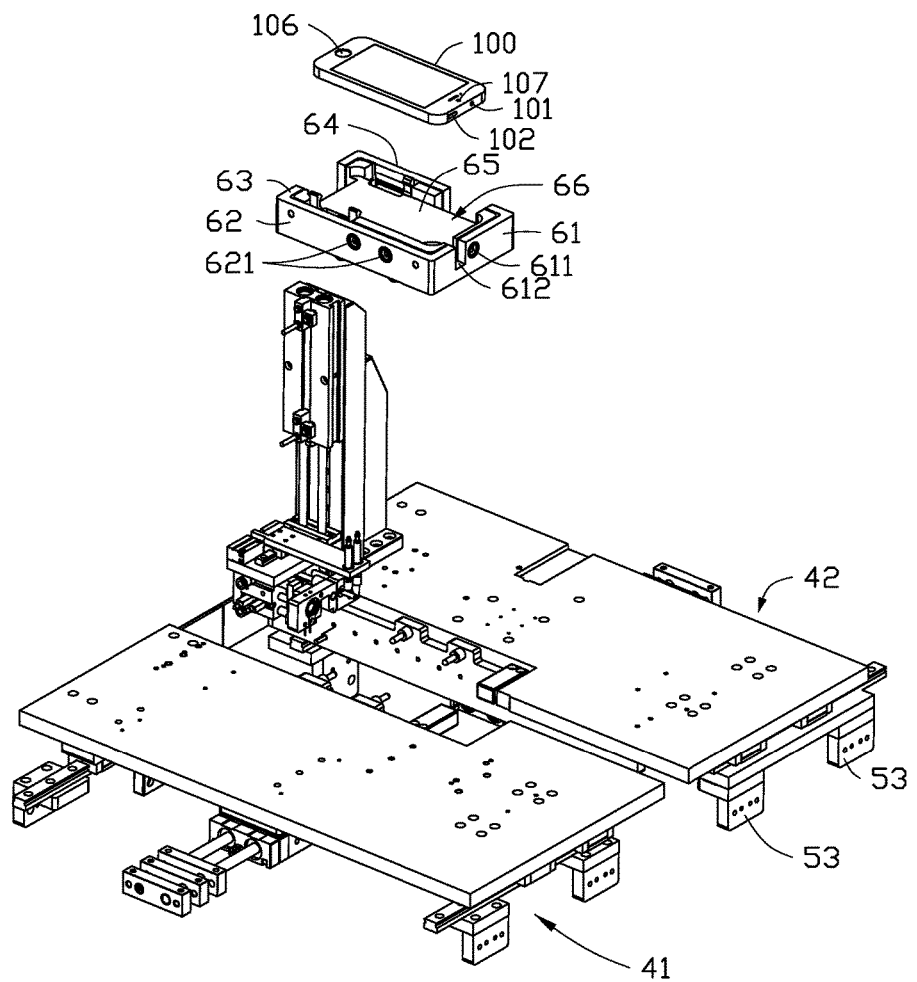
FIG. 4 is an isometric view of the mobile phone and a mobile phone receiving portion of the testing machine of FIG. 1.
Figure 5:
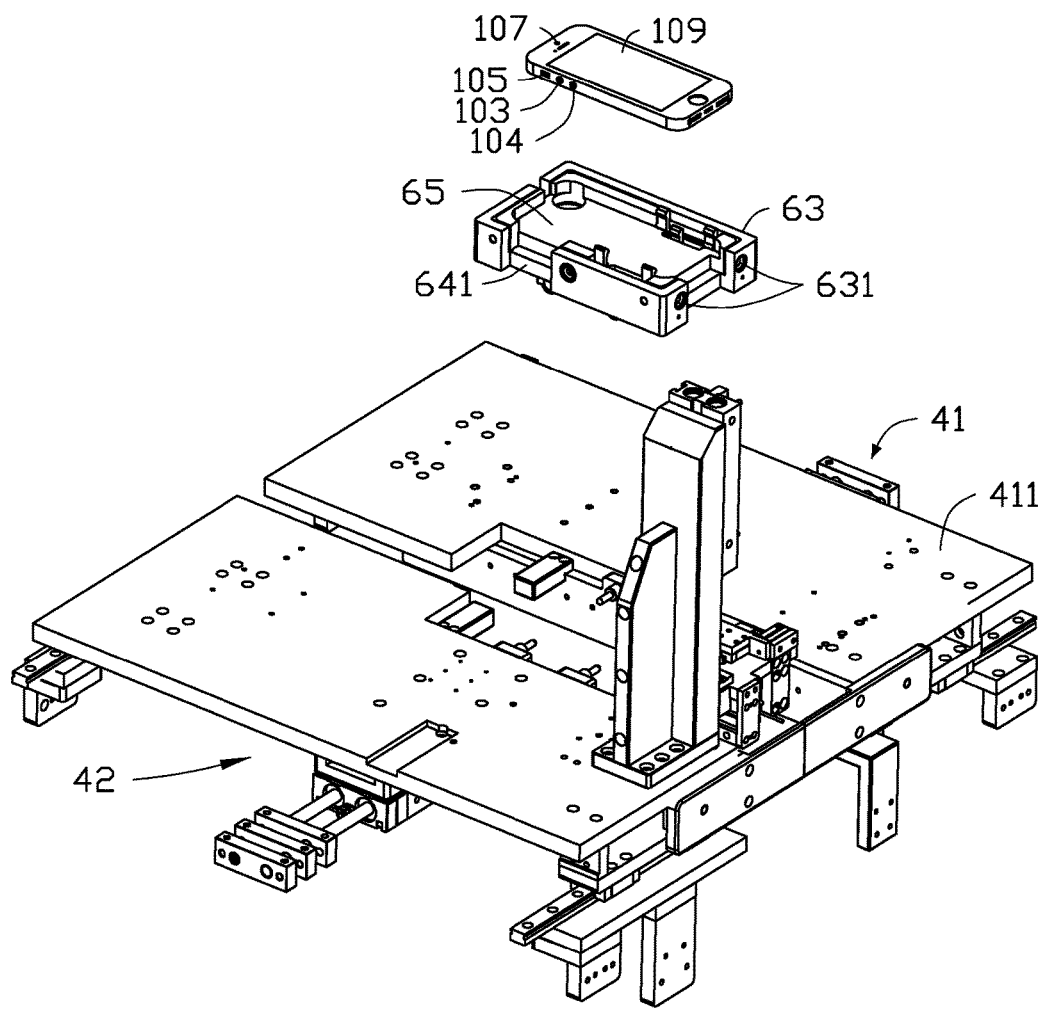
FIG. 5 is similar to FIG. 4, but viewed from a different angle.

FIGS. 4-5 illustrate one embodiment of the receiving portion 6 and the mobile phone 100. The mobile phone 100 includes a headset jack 101, a power button 102, a first volume button 103, a second volume button 104, a mute button 105, a menu button 106, a front-facing camera 107, a rear camera 108 (not shown), and a display screen 109. In at least one embodiment, the display screen 109 can be a touch screen. The receiving portion 6 includes a first side 61, a second side 62, a third side 63, a fourth side 64, and a bottom 65. The first side 61, the second side 62, the third side 63, the fourth side 64, and the bottom 65 cooperatively define a receiving space 66. The mobile phone 100 is received in the receiving space 66. The first side 61 defines a first hole 611 and a first cut 612. The first hole 611 corresponds to the headset jack 101. The first cut 612 corresponds to the power button 102. The second side 62 defines two second holes 621. The third side 63 defines two third holes 631. The fourth side 64 defines a second cut 641. The second cut 641 corresponds to the first volume button 103, the second volume button 104, and the mute button 105.

Figure 6:
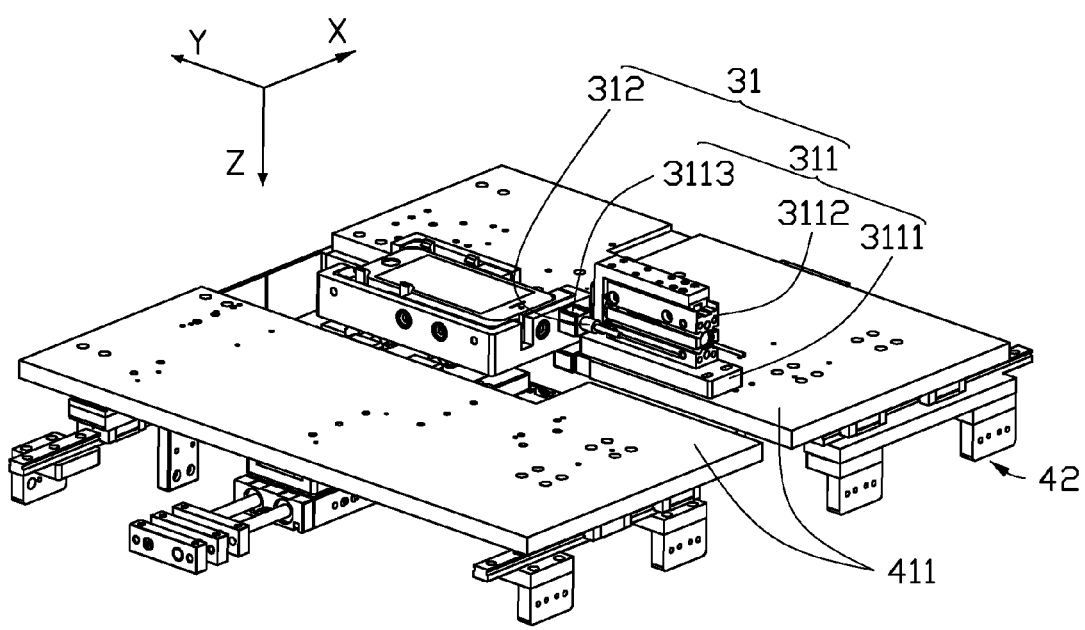
FIG. 6 is an isometric view of a testing device for a headset jack of the testing machine of FIG. 1.

FIG. 6 illustrates one embodiment of a headset jack testing device 31 of the detecting mechanism 3. The headset jack testing device 31 includes a first driving assembly 311 and a headset connector 312 mounted on the first driving assembly 311. The first driving assembly 311 includes a base 3111 mounted on the platform 41, a second cylinder 3112 mounted on the base 3111, and a first connecting member 3113 mounted on the second cylinder 3112. The headset connector 312 is mounted on the first connecting member 3113. The second cylinder 3112 drives the headset connector 312 to pass through the first hole 611 and engage in the headset jack 101.

Figure 7:
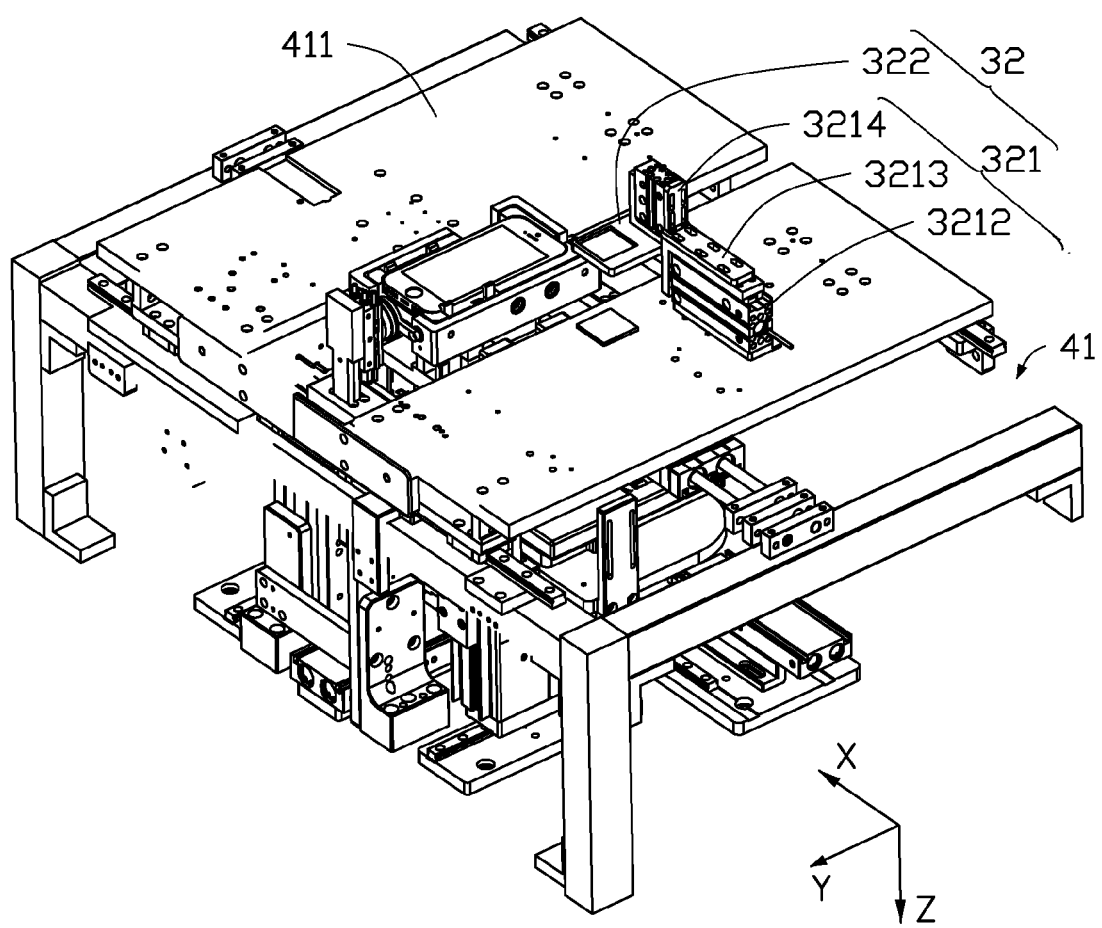
FIG. 7 is an isometric view of a testing device for sensing distances in relation to the testing machine of FIG. 1.

FIG. 7 illustrates one embodiment of a sensing distance testing device 32 of the detecting mechanism 3. The sensing distance testing device 32 includes a second driving assembly 321 and a baffle 322 mounted on the second driving assembly 321. The second driving assembly 321 includes a third cylinder 3212, a fourth cylinder 3214, and a second connecting member 3213 connected with the third cylinder 3212 and the fourth cylinder 3214. The baffle 322 is mounted on the fourth cylinder 3214. The third cylinder 3212 drives the fourth cylinder 3214 and the baffle 322 along a first direction X. Then the fourth cylinder 3214 drives the baffle 322 to move along a second direction Z. The baffle 322 is moved to the front-facing camera 107. The second direction can be substantially perpendicular to the first direction.

Figure 8:
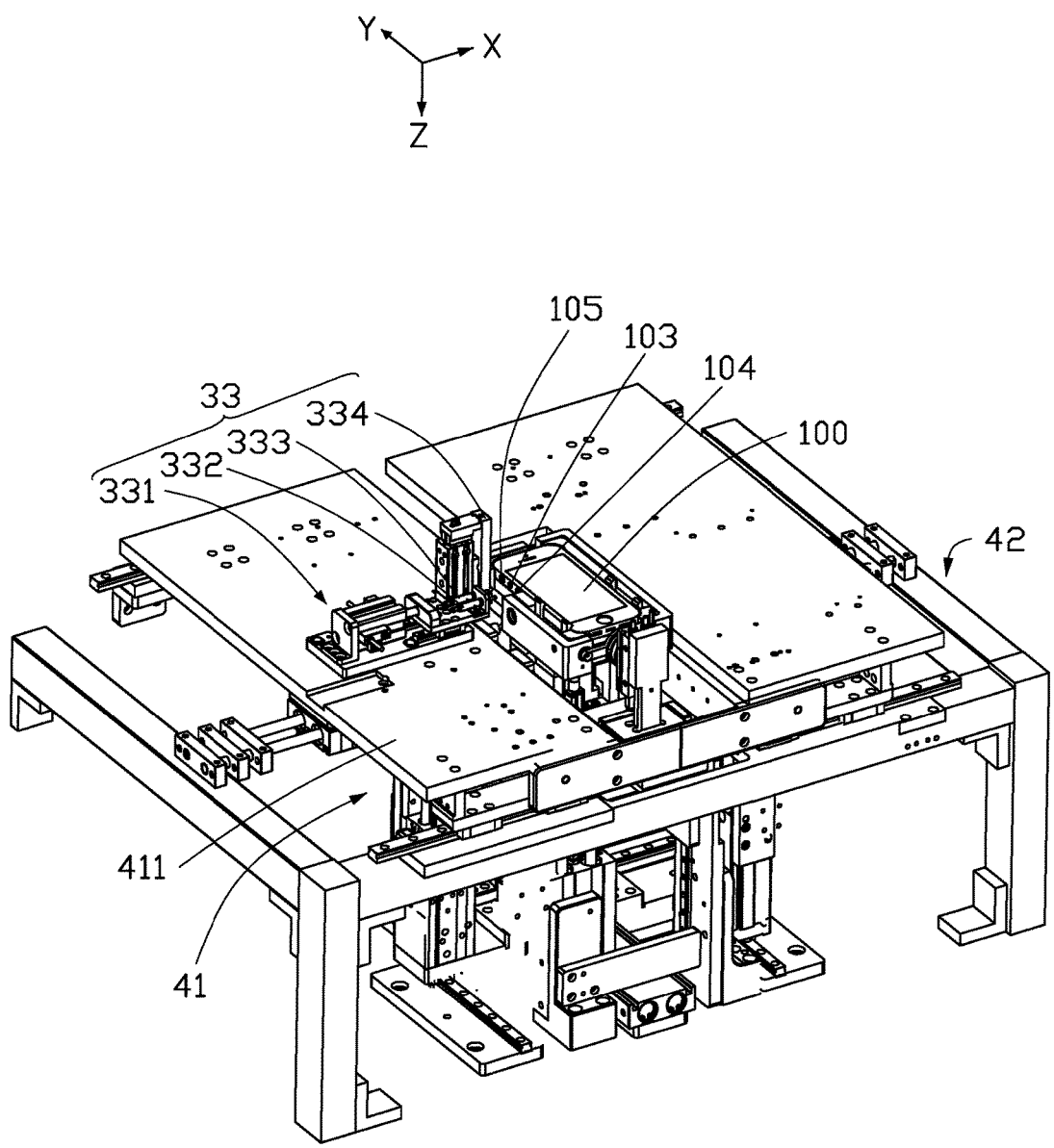
FIG. 8 is an isometric view of a device to test a first key, of the testing machine of FIG. 1.

FIG. 8 illustrates one embodiment of a first key testing device 33 of the detecting mechanism 3. The first key testing device 33 includes a third driving assembly 331, a first press member 332, a second press member 333, and a piece 334. The first press member 332, the second press member 333, and the piece 334 are mounted on the third driving assembly 331. The first press member 332 can push the first volume button 103 via the third driving assembly 331. The second press member 333 can push the second volume button 104 via the third driving assembly 331. The piece 334 can push the mute button 105 via the third driving assembly 331.

Figure 9:
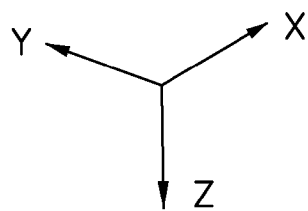
FIG. 9 is an isometric view of a device to test a second key, of the testing machine of FIG. 1.
Figure 9:
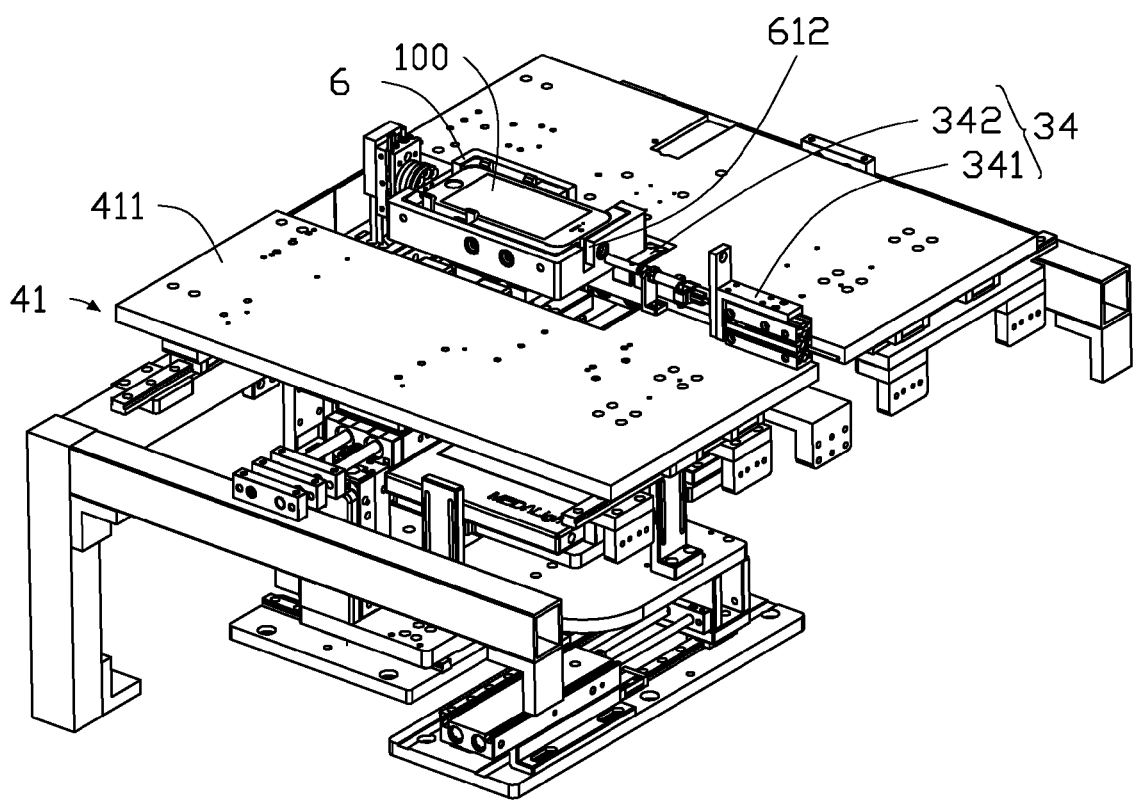

FIG. 9 illustrates one embodiment of a second key testing device 34 of the detecting mechanism 3. The second key testing device 34 includes a fourth driving assembly 341 mounted on the panel 411, and a third press member 342 mounted on the fourth driving assembly 341. The fourth driving assembly 341 drives the third press member 342 to move along direction Y. The third press member 342 passes through the first cut 612 and pushes against the power button 102.

Figure 10:
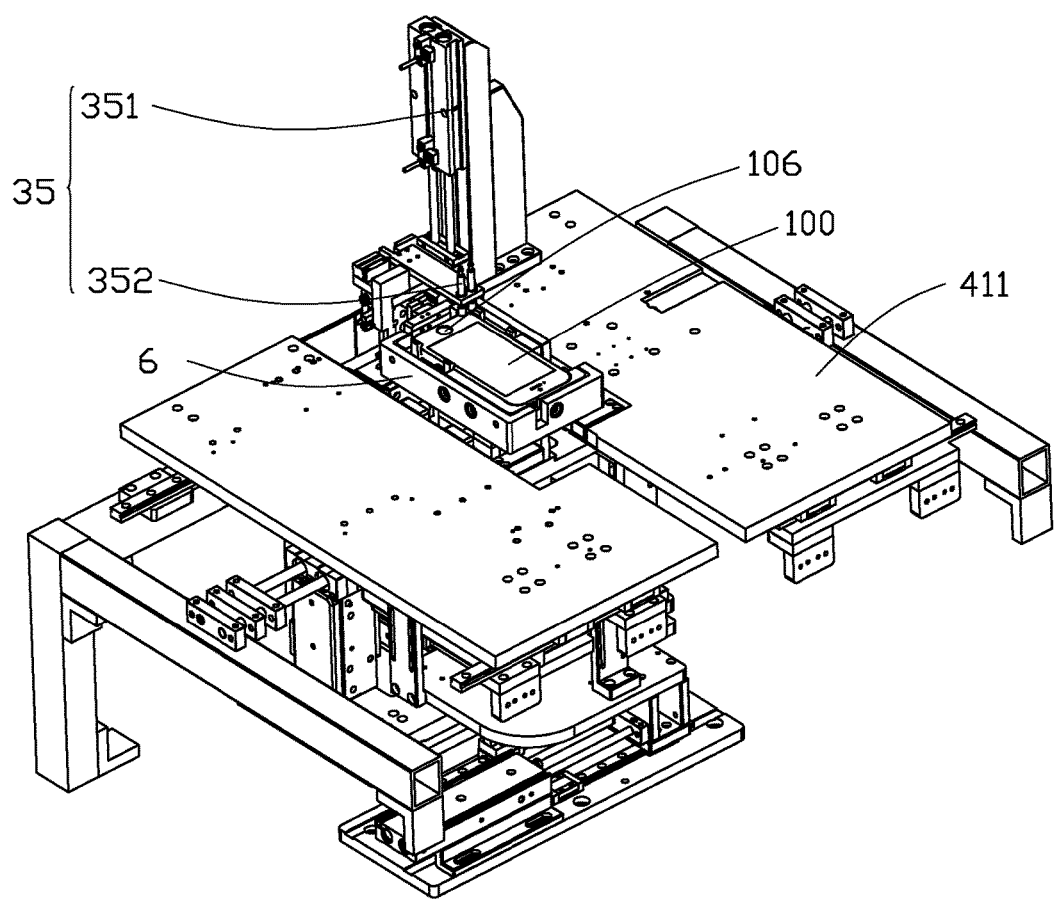
FIG. 10 is an isometric view of device to test a third key of the testing machine of FIG. 1.

FIG. 10 illustrates one embodiment of a third key testing device 35 of the detecting mechanism 3. The third key testing device 35 includes a fifth driving assembly 351 and a fourth press member 352. The fifth driving assembly 351 is mounted on the panel 411 of the second sliding platform 42. The fourth press member 352 is mounted on the fifth driving assembly 351. The fifth driving assembly 351 drives the fourth press member 352 to push the menu button 106.

Figure 11:
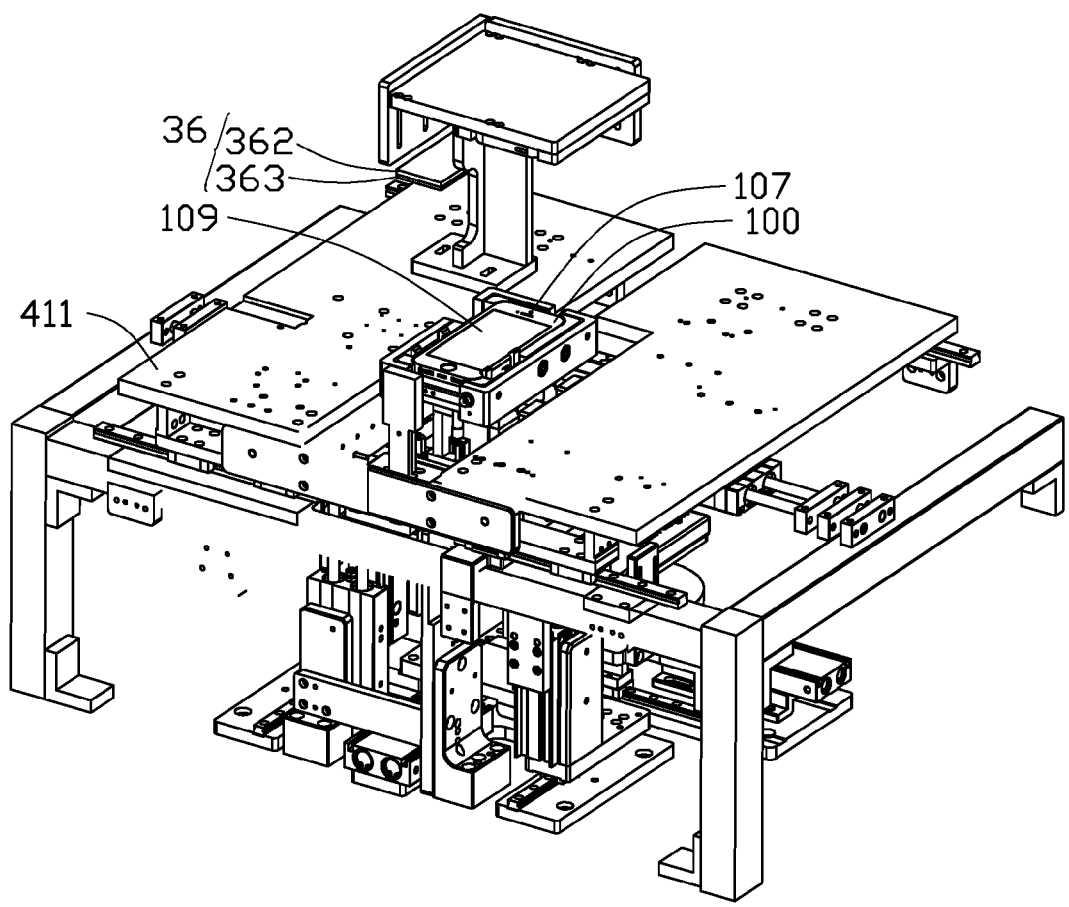
FIG. 11 is an isometric view of a device to test a front-facing camera of the testing machine of FIG. 1.

FIG. 11 illustrates one embodiment of a front-facing camera testing device 36 of the detecting mechanism 3. The front-facing camera testing device 36 includes a first plate 362 and a first picture 363 on the first plate 362.

Figure 12:
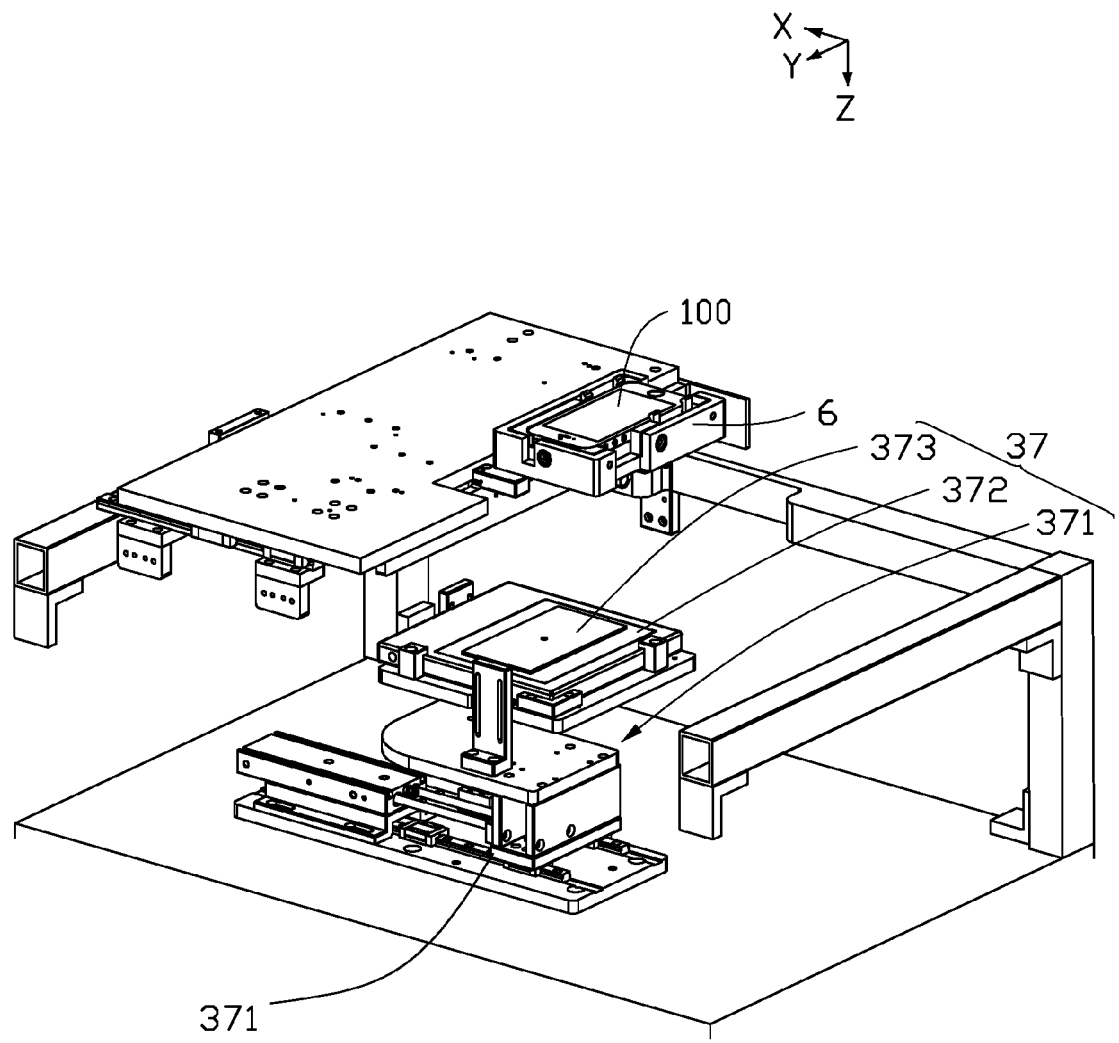
FIG. 12 is an isometric view of a device to test a rear camera of the testing machine of FIG. 1.

FIG. 12 illustrates one embodiment of a rear camera testing device 37 of the detecting mechanism 3. The rear camera testing device 37 includes a sixth driving assembly 371, a second plate 372 mounted on the sixth driving assembly 371, and a second picture 373 on the second plate 372.

Figure 13:
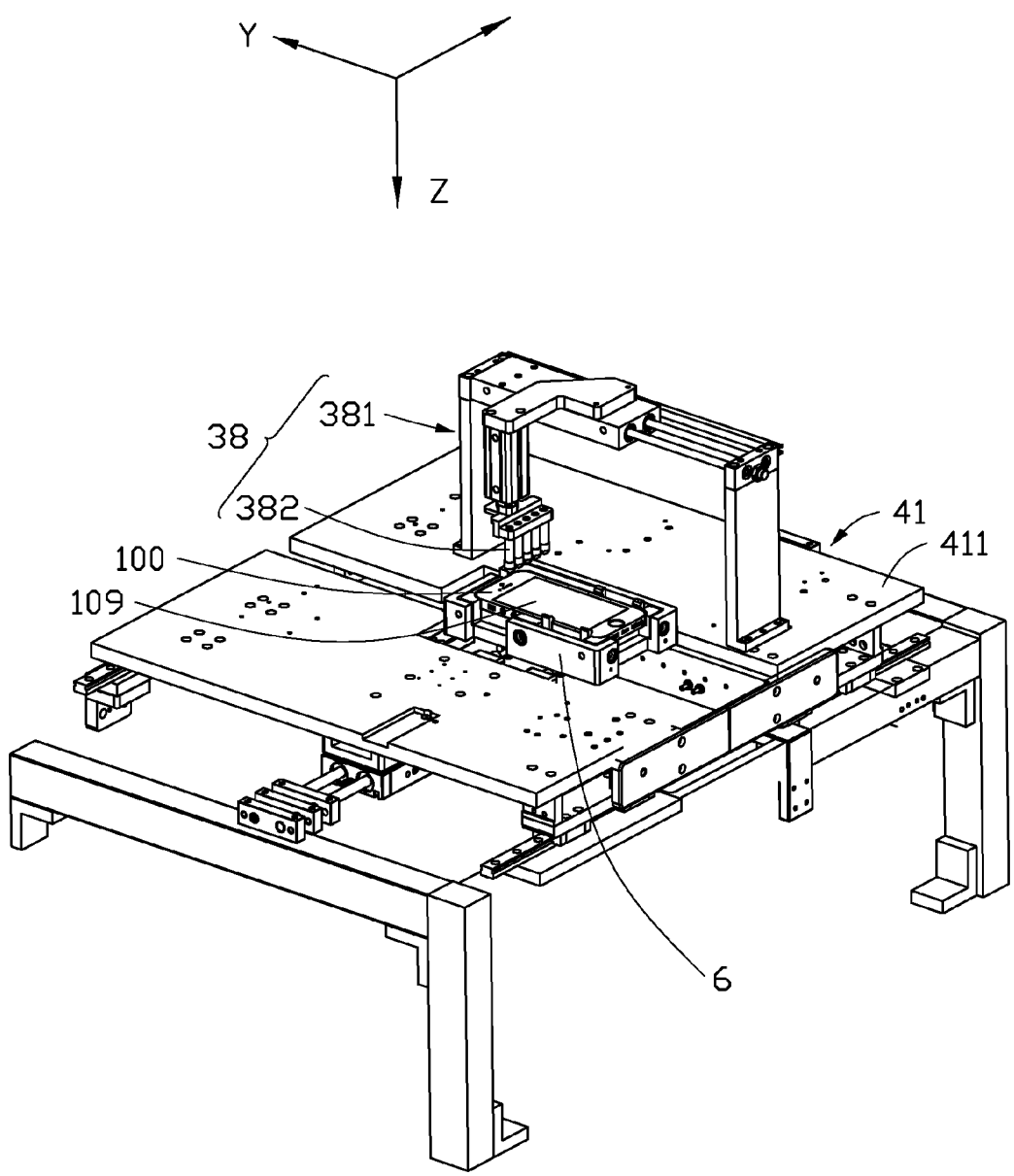
FIG. 13 is an isometric view of a device to test a touch screen of the testing machine of FIG. 1.

FIG. 13 illustrates one embodiment of a touch screen testing device 38 of the detecting mechanism 3. The touch screen testing device 38 includes a seventh driving assembly 381 and a plurality of styluses 382 mounted on the seventh driving assembly 381. The seventh driving assembly 381 drives the plurality of styluses 382 to operate and test the display screen 109.

Figure 14:
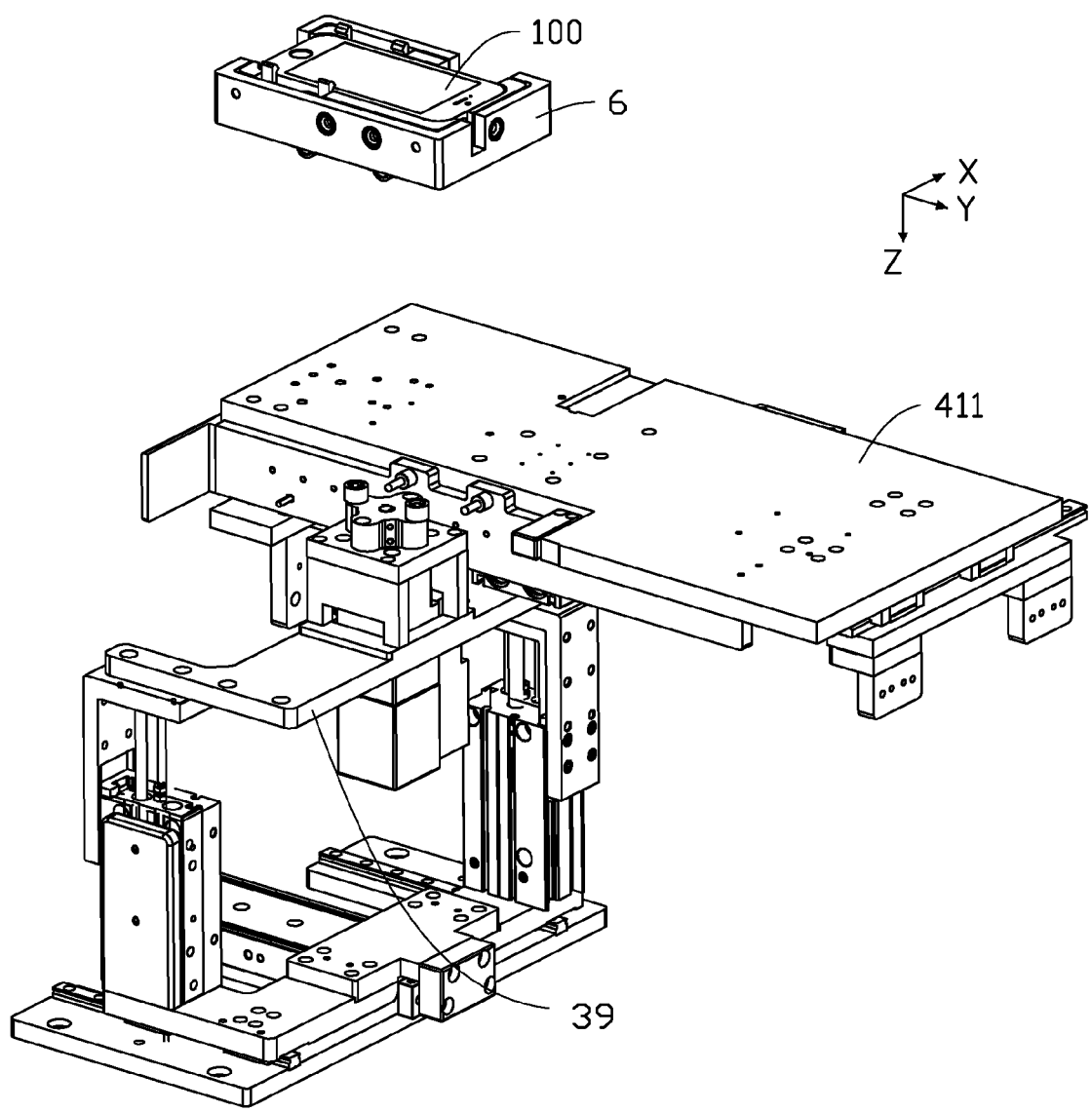
FIG. 14 is an isometric view of a device to test a compass of the testing machine of FIG. 1.

FIG. 14 illustrates one embodiment of a compass testing device 39 of the detecting mechanism 3. The compass testing device 39 drives the receiving portion 6 to rotate so as to test the compass (not shown).

Figure 15:
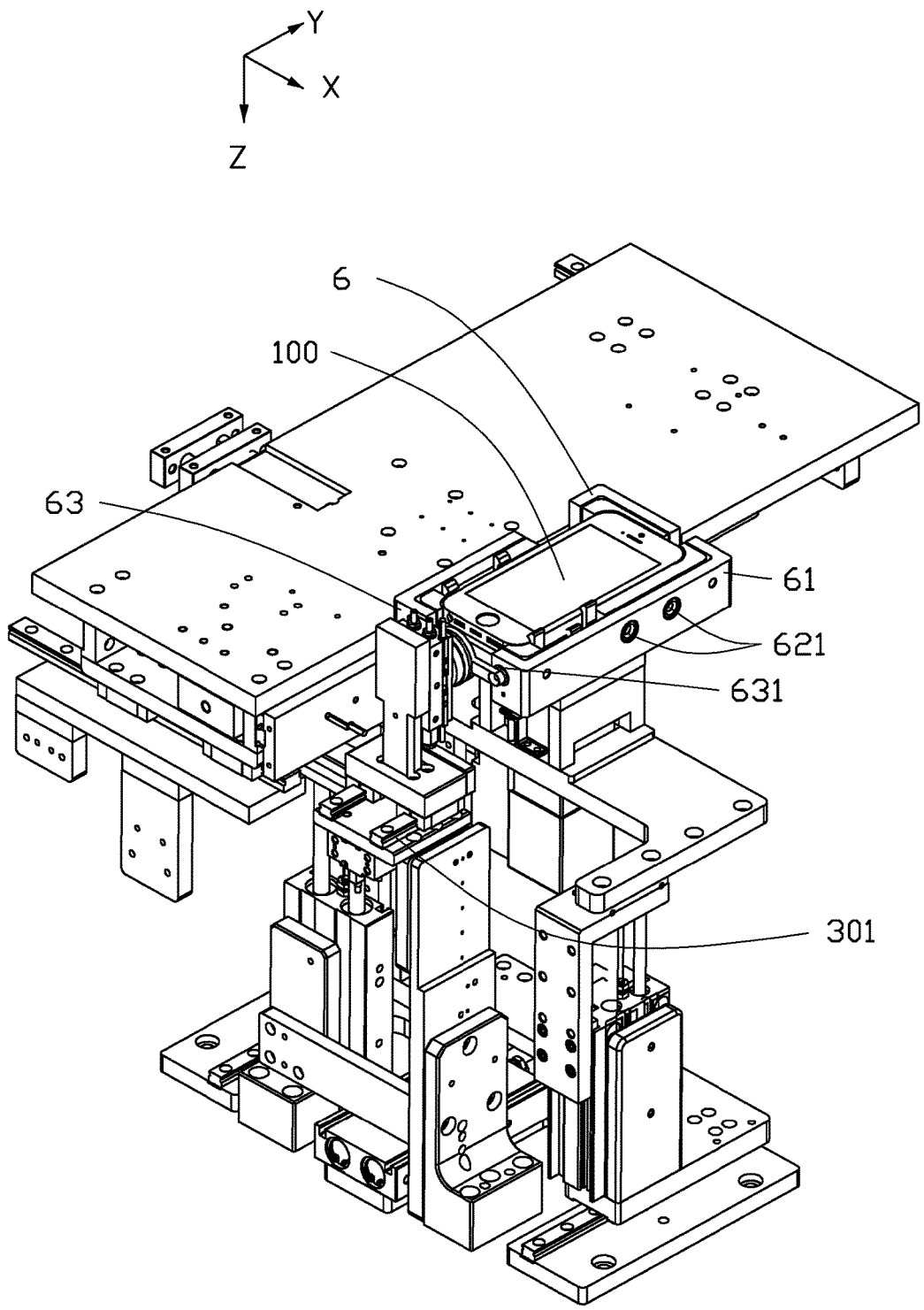
FIG. 15 is an isometric view of a device to test a first rotating mechanism of the testing machine of FIG. 1.
Figure 16:
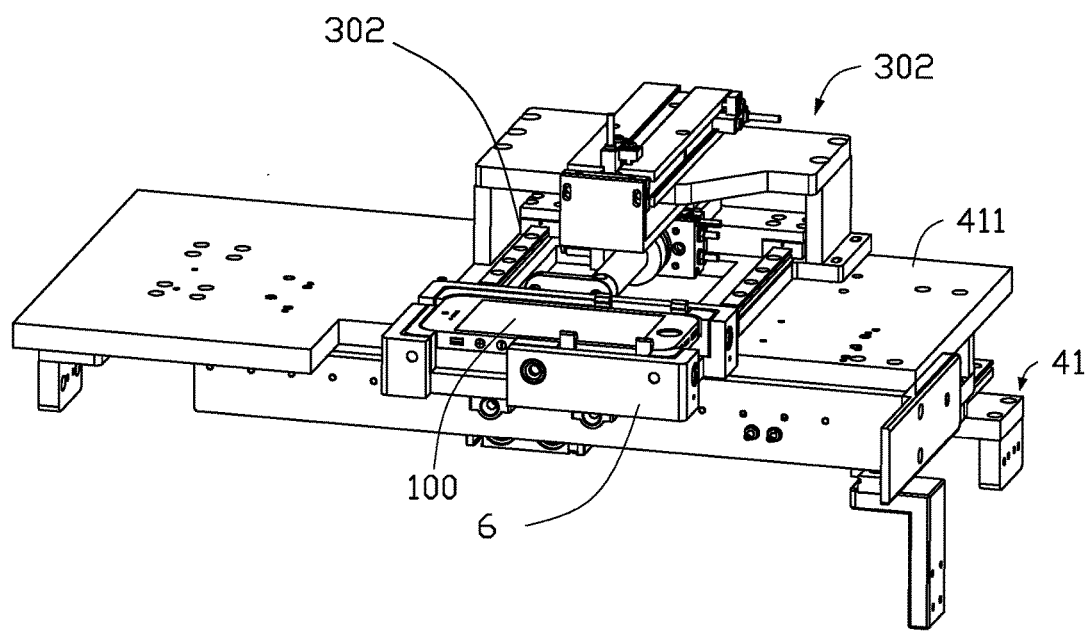
FIG. 16 is an isometric view of a device to test a second rotating mechanism of the testing machine of FIG. 1.

FIGS. 15-16 illustrate one embodiment of a first rotating mechanism 301 mounted on the box 2 and a second rotating mechanism 302 mounted on the panel 411. The first rotating mechanism 301 drives the receiving portion 6 to rotate about a third direction Y. The second rotating mechanism 302 drives the receiving portion 6 to rotate about direction X.

Figure 17:
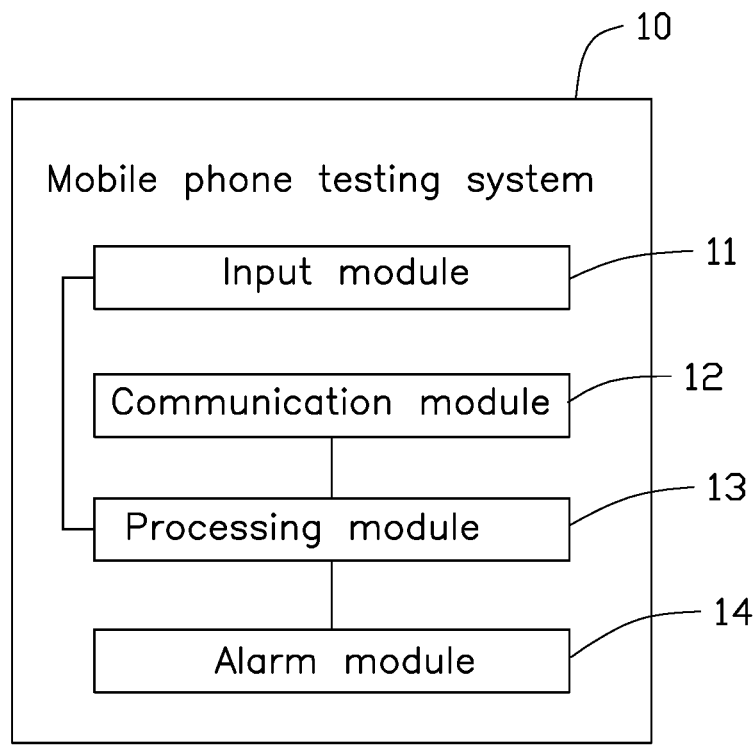
FIG. 17 is a block diagram of an embodiment of a testing system which can be applied in the testing machine of FIG. 1.

FIG. 17 illustrates one embodiment of a mobile phone testing system 10. The mobile phone testing system 10 is used in the testing machine 1. The mobile phone testing system 10 includes an input module 11, a communication module 12, a processing module 13, and an alarm module 14. The input module 11 is connected to the processing module 13 and can produce a starting signal. The processing module 13 receives the starting signal and tests the mobile phone 100. The communication module 12 is connected to the processing module 13. The communication module 12 can receive a communication signal from the mobile phone 100 or send a control signal from processing module 13 to mobile phone 100. The alarm module 14 is connected to the processing module 13, and when the processing module 13 detects an operation error, the alarm module 14 gives an alarm. In at least one embodiment, the mobile phone testing system 10, which comprises the input module 11, the communication module 12, the processing module 13, and the alarm module 14, is comprised of non-transitory computerized instructions in the form of one or more computer-readable programs stored in a storing device (not shown) and executed by the at least one microprocessor. That is, input module 11, the communication module 12, the processing module 13, and the alarm module 14 are in the at least one microprocessor.

Figure 18:
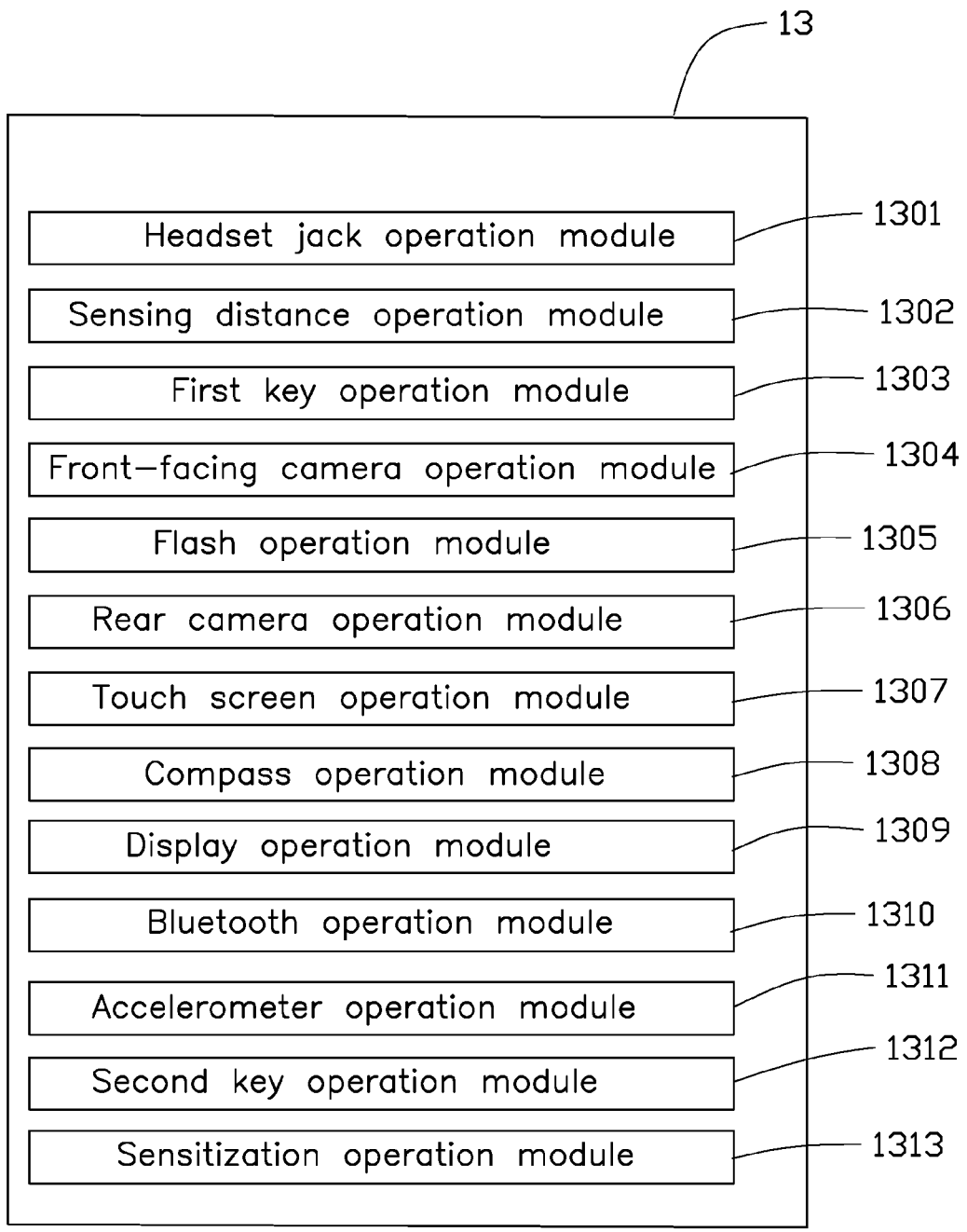
FIG. 18 is a block diagram of a processing module of the testing system of FIG. 17.

FIG. 18 illustrates one embodiment of a processing module 13. The processing module 13 includes a headset jack operation module 1301, sensing distance operation module 1302, a first key operation module 1303, a front-facing camera operation module 1304, a flash operation module 1305, a rear camera operation module 1306, a touch screen operation module 1307, a compass operation module 1308, a display operation module 1309, a BLUETOOTH operation module 1310, an accelerometer operation module 1311, a second key operation module 1312, and a sensitization operation module 1313.

The headset jack operation module 1301 can receive the starting signal from the input module 11 and produce a trigger signal. The trigger signal is sent to the mobile phone 100. The mobile phone 100 tests the headset jack 101.

The sensing distance operation module 1302 produces a starting signal after the headset jack 101 is tested. The starting signal is sent to the mobile phone 100 by the sensing distance operation module 1302. The sensing distance operation module 1302 drives the baffle 322 to move, via the third cylinder 3212 and the fourth cylinder 3214. The mobile phone 100 tests the front-facing camera 107.

The first key operation module 1303 produces a starting signal after the sensing distance operation module 1302 is tested. The starting signal is sent to the mobile phone 100 by the first key operation module 1303. The first key operation module 1303 drives the first press member 332 to push the first volume button 103. The first key operation module 1303 drives the second press member 333 to push the second volume button 104. The first key operation module 1303 drives the piece 334 to push the mute button 105.

The front-facing camera operation module 1304 produces a starting signal after the first key operation module 1303 is tested. The starting signal is sent to the mobile phone 100 by the front-facing camera operation module 1304. The front-facing camera 107 takes a picture of the first picture 363 and is thus tested.

The flash operation module 1305 produces a starting signal after the front-facing camera operation module 1304 is tested. The starting signal is sent to the mobile phone 100 by the flash operation module 1305. The mobile phone 100 opens the flash and takes a picture, thus undergoing a test.

The rear camera operation module 1306 produces a starting signal after the flash operation module 1305 is tested. The starting signal is sent to the mobile phone 100 by the rear camera operation module 1306. The mobile phone 100 drives the second picture 373 to move to enable testing of the rear camera.

The touch screen operation module 1307 produces a starting signal after the rear camera operation module 1306 is tested. The starting signal is sent to the mobile phone 100 by the touch screen operation module 1307. The touch screen operation module 1307 drives the plurality of styluses 382 to move to operate and test the display screen 109.

The compass operation module 1308 produces a starting signal after the touch screen operation module 1307 is tested. The starting signal is sent to the mobile phone 100 by the compass operation module 1308. The compass operation module 1308 drives the mobile phone 100 to rotate to test the compass (not shown).

The display operation module 1309 produces a starting signal after the compass operation module 1308 is tested. The starting signal is sent to the mobile phone 100 by the display operation module 1309. The display screen 109 displays viewable content. The content is photographed and displayed as a test.

The BLUETOOTH operation module 1310 produces a starting signal after the display operation module 1309 is tested. The starting signal is sent to the mobile phone 100 by the BLUETOOTH operation module 1310. The mobile phone 100 test the BLUETOOTH functionality.

The accelerometer operation module 1311 produces a starting signal after the BLUETOOTH operation module 1310 is tested. The starting signal is sent to the mobile phone 100 by the accelerometer operation module 1311. The first rotating mechanism 301 drives the mobile phone 100 to rotate around direction Y. The second rotating mechanism 302 drives the mobile phone 100 to rotate around direction X.

The second key operation module 1312 produces a starting signal after the accelerometer operation module 1311 is tested. The starting signal is sent to the mobile phone 100 by the second key operation module 1312. The second key operation module 1312 drives the third press member 342 to push the power button 102. The second key operation module 1312 drives the fourth press member 352 to push the menu button 106.

The sensitization operation module 1313 produces a starting signal after the second key operation module 1312 is tested. The starting signal is sent to the mobile phone 100 by the sensitization operation module 1313. The sensitization operation module 1313 drives the baffle 322 to move in direction X. The baffle 322 is above the display screen 109.

The embodiments shown and described above are only examples. Many details are often found in the art such as the other features of the testing machine. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A testing machine for a mobile phone comprising:
   a supporting mechanism mounted in a box;
   a platform mounted on the supporting mechanism and configured to slide, along a first direction, relative to the supporting mechanism;
   a receiving portion configured to receive the mobile phone and mounted on the platform, is the receiving portion rotated, along a second direction, relative to the platform, wherein the second direction is substantially perpendicular to the first direction, wherein the receiving portion comprises a first side, a second side, a third side, a fourth side, and a bottom, the first side, the second side, the third side, the fourth side, and the bottom cooperatively define a receiving space, the first side defines a first hole and a first cut, the second side defines two second holes, the third side defines two third holes, and the fourth side defines a second cut; and
   a detecting mechanism mounted on the platform being used to test the mobile phone.

2. A mobile phone testing system used in claim 1 of the testing machine, the mobile phone testing system comprising:
   at least one microprocessor configured to:
      produce a starting signal;
      receive the starting signal and test the mobile phone mounted in the testing machine; and
      receive a communication signal from the mobile phone or send a control signal to the mobile phone.

3. The mobile phone testing system of claim 2, wherein the at least one microprocessor is further configured to send an alarm to the mobile phone.

4. The testing machine of claim 1, wherein the platform comprises a first sliding platform and a second sliding platform, the first sliding platform and the second sliding platform are symmetry aligned on the supporting mechanism.

5. The testing machine of claim 4, wherein the detecting mechanism comprises a headset jack testing device mounted on the second sliding platform, the headset jack testing device comprises a first driving assembly and a headset connector mounted on the first driving assembly, and the headset connector is configured to pass through the first hole to be inserted into a headset jack of the mobile phone.

6. The testing machine of claim 4, wherein the detecting mechanism comprises a sensing distance testing device, the sensing distance testing device comprises a second driving assembly and a baffle mounted on the second driving assembly, the baffle is configured to above a front-facing camera of the mobile phone via the second driving assembly, the second driving assembly comprises a third cylinder, a second connecting member, and a fourth cylinder, and the baffle is mounted on the fourth cylinder.

7. The testing machine of claim 4, wherein the detecting mechanism comprises a first key testing device, the first key testing device comprises a third driving assembly, a first press member, a second press member, and a piece, the first press member, the second press member, and the piece are mounted on the third driving assembly, the first press member is configured to pass through the second cut and push a first volume button of the mobile phone via the third driving assembly, the second press member is configured to pass through the second cut and push a second volume button of the mobile phone via the third driving assembly, and the piece is configured to pass through the second cut and push a mute button of the mobile phone via the third driving assembly.

8. The testing machine of claim 4, wherein the detecting mechanism comprises a second key testing device, the second key testing device comprises a fourth driving assembly mounted on the first sliding platform and a third press member mounted on the fourth driving assembly, the third press member is configured to move towards the receiving portion via the fourth driving assembly, and the third press member pass through the first cut to push a power button of the mobile phone.

9. The testing machine of claim 4, wherein the detecting mechanism comprises a third key testing device, the third key testing device comprises a fifth driving assembly mounted on the second sliding platform and a fourth press member mounted on the fifth driving assembly, and the fourth press member is configured to push a menu button of the mobile phone.

10. The testing machine of claim 4, wherein the detecting mechanism comprises a front-facing camera testing device, the front-facing camera testing device comprises a first plate and a first picture fastened on the first plate, and the first picture is configured to be photographed by a front-facing camera of the mobile phone.

11. The testing machine of claim 4, wherein the detecting mechanism comprises a rear camera testing device, the rear camera testing device comprises a sixth driving assembly, a second plate mounted on the sixth driving assembly, and a second picture fastened on the second plate, the second plate and the second picture are configured to move towards the receiving portion, and the second picture is photographed by a rear camera of the mobile phone.

12. The testing machine of claim 4, wherein the detecting mechanism comprises a touch screen testing device, the touch screen testing device comprises a seventh driving assembly and a plurality of styluses mounted on the seventh driving assembly, and the plurality of styluses is configured to operate on a touch screen of the mobile phone.

13. The testing machine of claim 4, wherein the detecting mechanism comprises a compass testing device, and the receiving portion rotate is driven to rotate to test a compass of the mobile phone by the compass testing.

14. The testing machine of claim 4, wherein the detecting mechanism comprises a first rotating mechanism mounted on the box and a second rotating mechanism mounted on the first sliding platform, the receiving portion is driven to rotate about a third direction by the first rotating mechanism, and the receiving portion is driven to rotate about the first direction by the second rotating mechanism.

\* \* \* \* \*